S. D. Tucker. Sheet 1. 2 Sheets.

Inking Apparatus.

No. 4,084. Reissued Aug. 2, 1870.

Witnesses:

Andrew D. Lacy

Wm. H. Bishop

Inventor

Stephen D. Tucker

N. PETERS, PHOTO-LITHOGRAPHER, WASHINGTON, D. C.

S. D. Tucker. Sheet 2. 2 Sheets.
Inking Apparatus.
No. 4,084. Reissued Aug. 2. 1870.
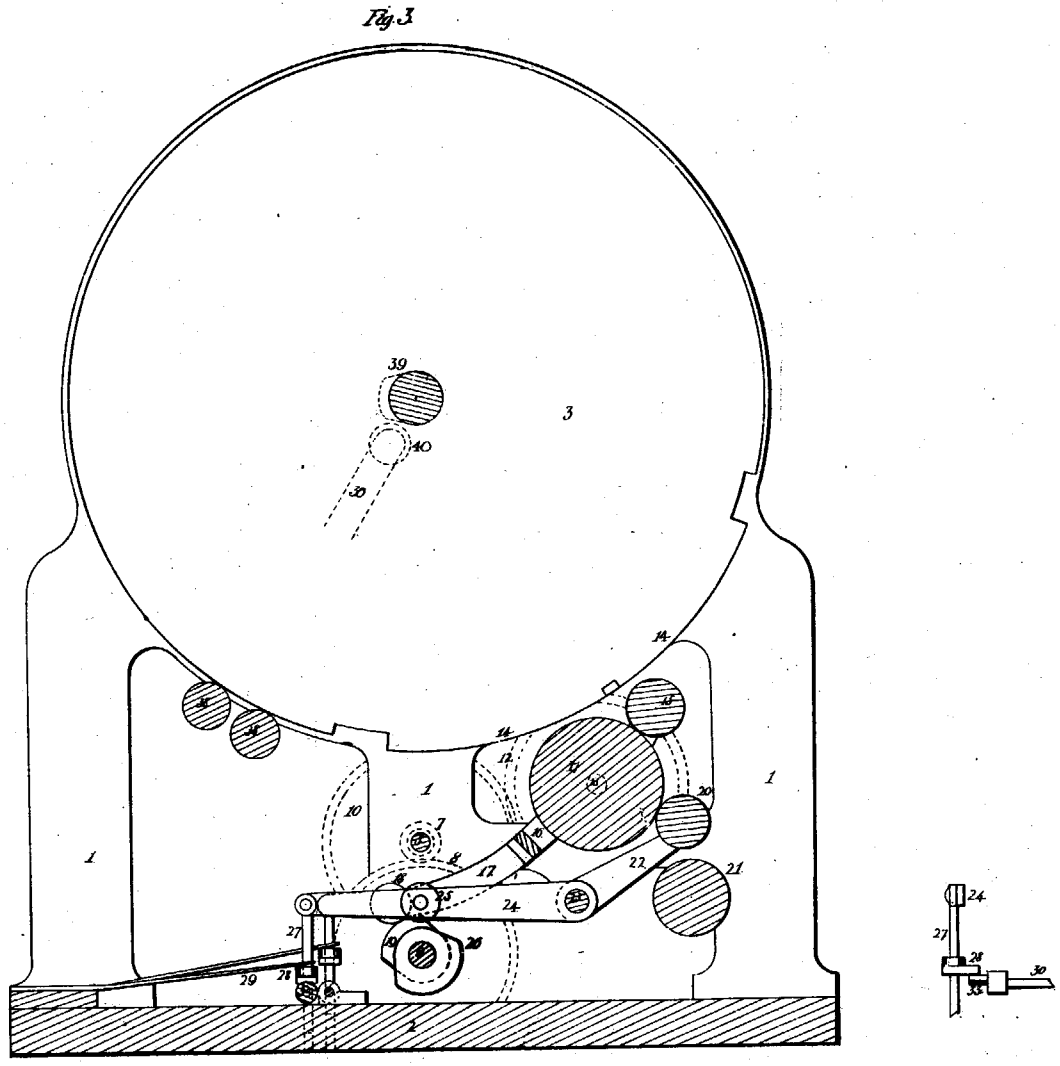
Witnesses:
Andrew Delacy.
Wm. H. Bishop
Inventor:
Stephen D. Tucker
N. PETERS, PHOTO-LITHOGRAPHER, WASHINGTON, D. C.

United States Patent Office.

R. HOE & COMPANY, OF NEW YORK, N. Y., ASSIGNEES OF STEPHEN D. TUCKER.

*Letters Patent No.* 43,350, *dated June* 28, 1864; *reissue No.* 4,084, *dated August* 2, 1870.

IMPROVEMENT IN PRINTING-PRESSES.

The Schedule referred to in these Letters Patent and making part of the same.

Be it known that STEPHEN D. TUCKER, of the city, county, and State of New York, has invented certain new and useful Improvements in Printing-Presses, of which the following is a specification.

*Nature and Objects of the Invention.*

The invention consists in certain novel combinations and arrangements of parts, which have for their object the operating the inking-rollers in a more perfect manner, and the distribution of the ink upon the forms, as will be fully set forth hereafter.

*Description of the Drawing.*

Figure 3 is a vertical longitudinal section.

*General Description.*

Figure 1:
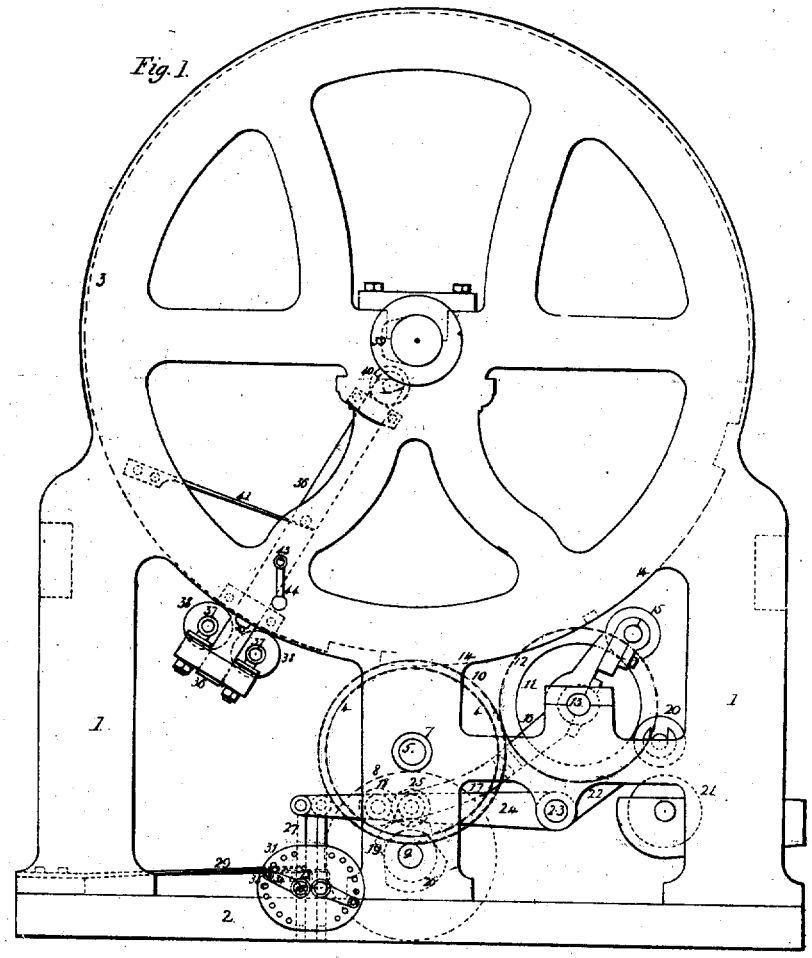
Figure 1 is a side elevation of a printing-press.

In this class of printing-presses the form or forms of type are arranged upon a segment of a rotating cylinder, the ink-distributing surface being on part of the circumference of the same cylinder, and the ink is transferred from what is known as the inking-cylinder to the ink-distributing surface of the type-cylinder by a composition roller.

In the accompanying drawing—

1 1 represent the side frames of a type-revolving printing-machine, which are secured to the foundation-plate 2.

The type-cylinder 3 revolves in bearings in the side frames, and is actuated by a pinion, 4, fixed on the driving-shaft 5, gearing into and driving the large wheel 6, keyed on the outer end of the type-cylinder shaft.

Another pinion on the driving-shaft 5 drives the wheel 8 and cam-shaft 9, to which it is fixed, and a third wheel, 10, on the driving-shaft, drives the inking-cylinder 11, through the medium of the wheel 12, fixed on the shaft 13, outside of the side frames.

The position of the forms of type upon the periphery of the type-cylinder is represented, at 14 14, by that portion of the circumference which is raised above the rest, the remainder being made about one-quarter of an inch less radius than the forms, and is used as an ink-distributing surface.

The composition roller 15, for supplying ink to and distributing it over the ink-distributing surface of the type-cylinder, always revolves in contact with the periphery of the inking-cylinder 11, and, at intervals, with the ink-distributing surface of the type-cylinder, but, as the forms of type approach, it is moved away from the type-cylinder, to let them pass without touching.

This is effected by the roller 15, running in bearings in a frame, 16, that hangs freely on the shaft 13 of the inking-cylinder 11; and an arm, 17, projecting from the lower part of the frame, carries a friction-roller, 18, against which the cam 19 on the cam-shaft 9 operates.

The position of the cam 19 upon its shaft is such that it lifts the arm 17, and, consequently, depresses the roller 15 for the passage of the forms of type.

The hanging of the frame 16 upon or near the axis of rotation of the inking-cylinder 11 insures its running always in contact with the said cylinder, notwithstanding its vibrations to and from the ink-distributing surface of the type-cylinder, to permit the forms to pass.

The composition roller 20, that supplies the ink from the fountain-roller 21 to the inking-cylinder 11, runs in bearings in a frame, 22, pivoted to the side frame 11, at 23, and the frame has an arm, 24, extending backward, and carrying a friction-roller, 25, that is operated by the cam 26 on the cam-shaft 9, in a similar manner to the frame 16, as described above. By these means the roller 20 is depressed in contact with the fountain-roller 21, from which it receives a quantity of ink, and is lifted up against the inking-cylinder, upon which it distributes the ink.

As the rollers 15 and 20 are required to have the above-described motions, and to make a given pressure suited to their elasticity, and as they are constantly decreasing in diameter, it is necessary to adjust them at intervals.

To effect this a rod, 27, is joined to the extreme end of the arm 24, and runs down through a hole in the foundation-plate 2.

To this rod is fixed a collar, 28, upon which the end of a strong, flat spring, 29, rests, the tension of which forces the roller 20 against the inking-cylinder 11; but, to prevent the pressure from being too hard against the inking-cylinder, and also to adjust the roller as it becomes smaller from use, there is a regulating-shaft, 30, which extends from the outside of the side frame, through an index-plate, 31, and journal-box 32 on the foundation-plate, and this shaft has an eccentric pin, 33, shown in the detail view in fig. 3, which projects from its inner end, and upon this pin the collar 28 of the rod 27 descends, so that, by turning the regulating-shaft 30, the elevation of the eccentric pin can be readily adjusted to determine the extent to which the collar 28 and rod 27 shall descend, and thus regulate the roller 20, and its upward pressure against the inking-cylinder.

In order to keep the regulating-shaft in any required position, an arm, 34, is fixed on its outer end, having a thumb-screw, 35, passing through its extremity, the point of which presses against the index-plate 31.

The pressure and motion of the composition roller 15, upward against the ink-distributing surface of the type-cylinder, are regulated by an arrangement precisely similar to the above, applied to the arm 17 of the frame 16.

The rollers 38, for inking the forms of type, have their bearings 37 in radial arms or bars 36.

As the type-cylinder revolves, these rollers are in contact with the ink-distributing surface of the cylinder; but, as the forms of type 14 approach the rollers, the cams 39 39, fig. 3, on the shaft of the type-cylinder operate against the friction-rollers 40 40 on the inner ends of the radial bars.

They are thus pressed out from the center a distance equal to the difference between the radii of the ink-distributing surface and the surface of the type, which, as before stated, is about one-fourth of an inch; and, when the form has passed them, they are pressed back again by the springs 41 41, until the stop-pins 42 42 rest against the side frames.

43 43 are two short shafts, that pass through and turn in holes in the side frames.

Figures 4, 5:
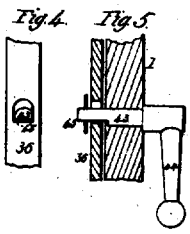
Figures 4 and 5 are sections, on an enlarged scale, of parts of one of the radial bars.
Figure 2:
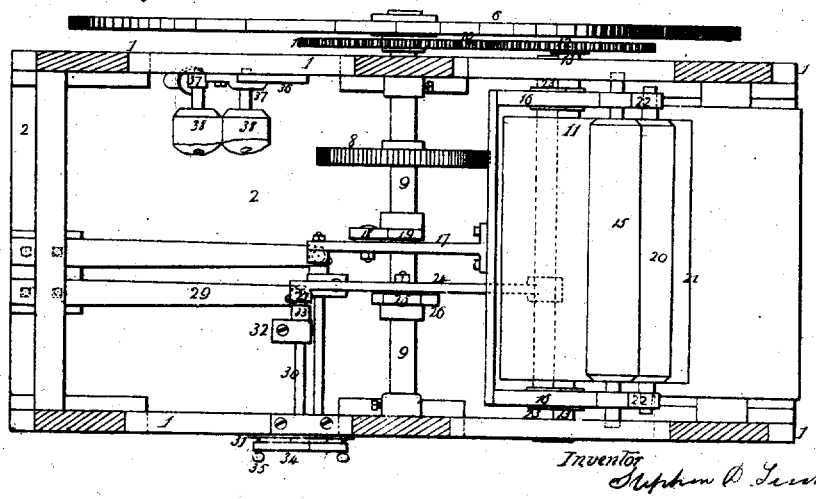
Figure 2 is a plan, with a type-cylinder removed to exhibit the mechanism below.

The outer ends of these shafts have each a weighted lever, 44, which tends to hang down in a perpendicular position, and the inner ends pass through square mortises in the radial bars, (see figs. 4 and 5.)

That portion of each of the said shafts that is in contact with the lower edge of the mortise in the radial bar, when the weighted lever hangs downward, is cut flat, as shown at 45, and is so placed that, when the weighted lever hangs perpendicularly, the flat sides are at right angles to the line of the radial bars. In this position of the shafts the radial bars can be pressed in toward the center, so that the inking-rollers 38 38 bear against the ink-distributing surface of the type-cylinder.

If the shafts 43 be now turned, while the bars are in the above position, so that their weighted levers reach a horizontal position, their inner ends will act as cams upon the lower edge of the slots in the radial bars, and draw them out from the center about three-sixteenths of an inch. This will of course draw the inking-rollers clear from the ink-distributing surface of the type-cylinder.

The pressure of the bars against the lifters, caused by the springs 41 41, will be sufficient to prevent the outside levers from turning back to their original position, and thus the bars and rollers are held out.

If the machine should be started without turning back the shafts 43 43, the cams 39, as they pass the friction-rollers 40 on the radial bars, will force them outward about one-sixteenth of an inch further, and thus relieve the shafts, which, by the gravity of their outside weighted levers, will be turned back to their original position, leaving the bars and rollers free to be operated as before.

By this arrangement, the rollers can be thrown out from the ink-distributing surface when the machine is at rest, and thereby prevent the surfaces from being injured by contact.

*Claims.*

What is claimed as the invention of STEPHEN D. TUCKER is—

1. Arranging the inking-rollers so that they may be raised from the inking surface, when desired, by the mechanical device, constructed, shown, and described, or its equivalent, substantially as set forth and specified.

2. So arranging the inking-rollers that, if out of contact with the inking surface, they will be restored to their operative condition as the form of type reaches them in operating the press, substantially as described and specified.

3. So arranging the frame 16, which carries the roller 15, which transfers the ink from the inking-cylinder to the ink-distributing surface of the type-cylinder, that it shall vibrate on the axis of the inking-cylinder, substantially as described and specified.

4. The combination, with the radial bars 36, of the rollers 38, for inking the forms of type, and the eccentric shafts 43 with their weighted levers 44, or equivalents, for disconnecting the rollers from the ink-distributing surface of the type-cylinder, substantially as described.

5. Adjusting the range of motion and pressure of the rollers 20, which transfer the ink from the fountain-roller to the inking-cylinder, and 15, which transfers the ink from the inking-cylinder to the ink-distributing surface of the type-cylinder, or either of the said rollers, by the employment of the shafts 27, with the eccentric pins 33, or the equivalents thereof, in combination with the swinging frame, which carries the roller, and is vibrated against the inking surface by a cam, and against the eccentric pin 33 by a spring, or equivalent therefor, substantially as described and specified.

R. HOE & CO.

Witnesses:
C. A. DURGIN,
EDWARD E. OSBORN.